United States Patent

[11] 3,585,981

[72] Inventor Etienne Ombredane
     Paris, France
[21] Appl. No. 781,871
[22] Filed Dec. 6, 1968
[45] Patented June 22, 1971
[73] Assignee CSF Compagnie Generale De Telegraphic
     Sans Fil
[32] Priority Dec. 18, 1967
[33] France
[31] 132699

[54] HIGH-PRECISION UNIFORM CLAMPING DEVICE
     6 Claims, 8 Drawing Figs.
[52] U.S. Cl. .................................................. 125/17,
                                                                  269/225
[51] Int. Cl. .................................................. B25b 1/16,
                                                                  B28d 1/06
[50] Field of Search .......................................... 269/225;
                                                                  125/17, 16

[56]               References Cited
              UNITED STATES PATENTS
3,168,087  2/1965  Anderson .................... 125/16
  691,267  1/1902  Hill ............................ 269/275

Primary Examiner—Harold D. Whitehead
Attorney—Edwin E. Greigg

ABSTRACT: A clamping device in which the clamping forces are exerted by clamping screws through the medium of deflecting members. The measurement of these forces being effected by measuring the deflection of said members. For achieving a uniform clamping, a first beam which is capable of pivoting about one of its edges and another beam which can pivot with respect to the other edge of the first beam are interposed between the deflecting members and the part which is clamped.

HIGH-PRECISION UNIFORM CLAMPING DEVICE

The present invention relates to a high-precision clamping device.

A device of this kind has numerous possible applications but is intended in particular, but not exclusively, for use in a tool of the kind employed for cutting up lengths of ferrite or monocrystals, into sections.

A tool of this kind comprises a stack of blades and spacers, clamped inside a C-shaped stirrup. It is used in a reciprocating machine to cut up plates of ferrite or monocrystals under a stream of abrasive-charged liquid.

In order to produce the desired cutting profile, it is necessary for the blades to be precisely parallel with one another, within 1 or 2 microns. However, this degree of precision cannot be achieved using conventional devices, with clamping screws, in which the clamping action is controlled by using a torque spanner.

It is the purpose of the present invention to overcome this drawback and to provide a high-precision clamping device.

According to the invention, there is provided a high-precision clamping device comprising: a C-shaped stirrup having two jaws; a beam parallel to said jaws; clamping screws for exerting clamping forces on said summer; and inverted-U profiled bending members interposed between said screws and said summer.

For a better understanding of the invention and to show how the same may be carried into effect, reference will be made to the drawings accompanying the following description and in which.

Figure 5A:
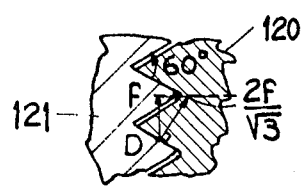
Figure 5B:
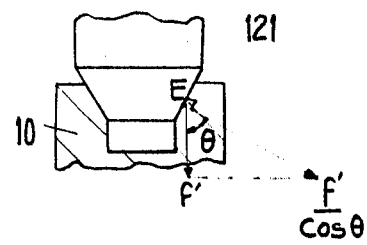
Figure 6A:
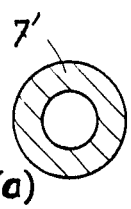
Figure 6B:
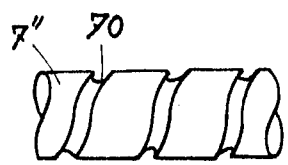

FIGS. 5(a) and 5(b) illustrate, on an enlarged scale, details of the device according to the invention; and FIGS. 6(a) and 6(b) show other embodiments of another element of the device according to the invention.

The clamping device in accordance with the invention will be described, although without in any way intending thereby any limitation of the scope of the invention, within the context of its use in a tool for cutting up ferrites or monocrystals into lengths.

Figure 1:
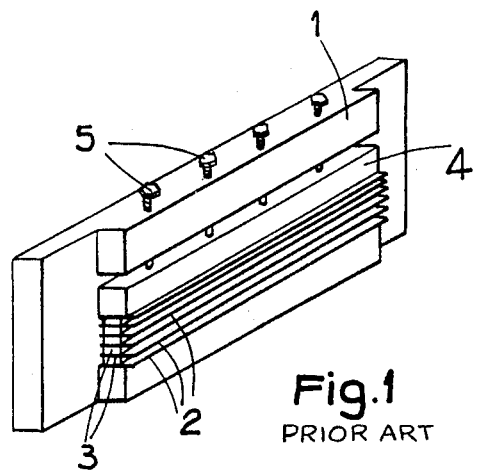
FIG. 1 illustrates a conventional clamping device.

In FIG. 1, a known tool of this type is illustrated. An assembly of blades 2, separated from one another by spacers 3, is clamped between the jaws of a C-shaped stirrup 1. The clamping is achieved by means of screws 5 acting upon a beam 4 designed to distribute the screw thrust. The clamping force of the screws is controlled by means of a torque spanner.

The tool is mounted on a machine which moves it in a reciprocating manner, i.e. one which causes the tool to move parallel to the plane of the blades. The blades are watered with a liquid charged with an abrasive, to enable them to saw the ferrite or monocrystalline plates which are suitably fixed, and to produce a profile which is complementary to the profile determined by the projection of the blades in a plane perpendicular to the direction of their displacement. In order that this profile shall be absolutely uniform, it is necessary for the blades 2 to be strictly parallel to one another, within 1 or 2 microns.

For this reason, it is necessary to prevent any warping whatsoever of the blades, and any variation in the clamping force along their length. However, tightening up the screws 5 with a torque spanner is not sufficient on its own to achieve this degree of precision. As a matter of fact, the variation in fit between male and female threads of a threaded pair means that there is a ratio between the clamping torque and the axial effort exerted, which may vary from one screw to another.

On the other hand, the condition of the thread surface as well as the quality of the lubrication, have an effect upon this ratio. Also, it is well known that the initial friction is much higher than the normal friction encountered at a relative speed of displacement between the rubbing surfaces, other than zero, and this therefore influences the said ratio to a degree depending upon how the clamping couple is produced. For example, a screw tightened up with a continuous movement to a figure of 120 Newton-meters, and then left alone, cannot be made to rotate again at a torque of any less than 180 to 200 Newton-meters. All these factors thus indicate that there can be no hope of achieving an adequate degree of precision in the clamping of the blades, in this way.

According to the invention, the clamping effort exerted on the blades is measured directly, and not indirectly through the medium of a screw-tightening torque as before.

Figure 2:
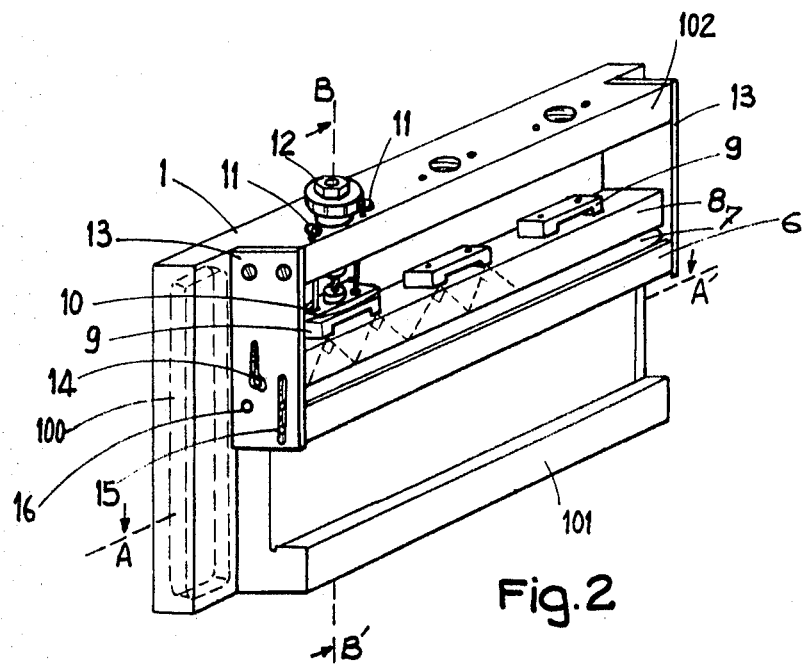
FIG. 2 illustrates, in perspective, the clamping device according to the invention.

In FIG. 2, one embodiment of the clamping device in accordance with the invention has been illustrated. It comprises a C-shaped stirrup 1, with two jaws, 101 and 102.

For the sake of clarity, the stacking of the blades and spacers has not been illustrated.

The clamping of this stack is produced by means of differential clamping screws 12 (only one screw has been illustrated). The operation of these screws will be indicated later. These screws act, through of a part 10 on which the screw abuts and which is guided on guide rods 11, on inverted U-shaped bending members 9, whose edges bear upon a beam 8. The screws are applied to members 9 in their plane of symmetry and parts 10 are shaped to this end as shown in FIG. 2.

Figure 3:
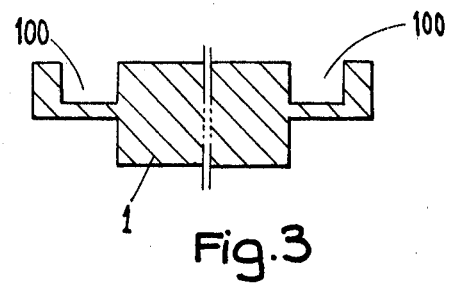
FIGS. 3 and 4 are respective sections along the lines AA' and BB' of FIG. 2.

The beam 8 serves to distribute uniformly the forces transmitted to it by members 9. The forces applied to the beam 8 are passed to another beam 6. To this end the beam 8, in the bottom face of which two shoulders are formed, freely rests on two circular section bars 16 and 7 respectively resting on a shoulder 103 formed in the stirrup 1 and in a V-shaped groove formed in the upper surface of the summer 6. The stack of blades and spacers is clamped between the jaw 101 and the summer 6. Slides 14 and 15, formed in plates 13 laterally fixed to the stirrup 1, serve to guide the summer 8, the bar 7 and the summer 6. The lateral extremities of the stirrup 1 have recesses 100, as FIG. 3 shows, the latter figure being a partial section on a horizontal plane passing through AA'.

The operation of the system is a follows:

The differential screws 12, each comprise a hollow screw 120 screwed into the jaw 102. Inside this hollow screw is screwed threaded rod 121 which bears, through its truncated conical end, on the part 10. The latter part, through the medium of the members 9, transmits the clamping forces to the summer 8.

Due to the pivoting of the beam 8 about the bar 16, the bar 7 is displaced parallel to itself. Thus any effect on the parallelism of the blades, due to possible buckling of the beam 8, is avoided. The beam 8 has a thickness such that the distribution of the forces exerted by the beam 9 is substantially uniform over the bottom face of the beam 8. Assuming, for example, that, with the elements selected, the forces exerted at each area of contact of the beam 9 are distributed within a dihedron of 90°, the thickness of the summer 8 will be such that the adjacent faces of two neighboring dihedrons intersect at the bottom face of the beam 8, as illustrated in broken line in FIG. 2.

The pivoting of the beam 6 about the bar 7 compensates for the opening of the C-shaped stirrup 1 under the clamping forces, and thus keeps the bottom face of the beam 6 parallel with the top face of the jaw 101. Moreover, the bar 7, by its elastic deformation, contributes to the further improvement of the loading distribution on the beam 6.

The elasticity of contact between the bar 7 and the walls of the two beams 6 and 8 can be still further improved by using the embodiments 7' and 7'' of this bar, illustrated in FIGS. 6(a) and 6(b). The round bar of FIG. 6(a) is hollow, to confer to it added elasticity. The round bar 7'' of FIG. 6(b) is solid but carries a helical groove 70 which reduces the area of contact and promotes elastic deformation of the areas contacting the bar. On the other hand, in order to achieve more uniform deformation of the stirrup 1 and to avoid stresses at the extremities of the blades, the stirrup 1 is weakened at its edges by the provision of the recesses 100.

Measurement of the clamp forces exerted by the screws 12, which is one of the most important factors in achieving precision location of the blades, is effected by measuring the deflection of the members 9 with a slip gauge. This deflection may, for example, be in the order of 20 microns. Due to this method and to the improvements introduced by the present invention, a kind of clamping is obtained the dispersion of which is about only one-hundredth of that occuring in ordinary clamping system using a torque spanner.

Figure 4:
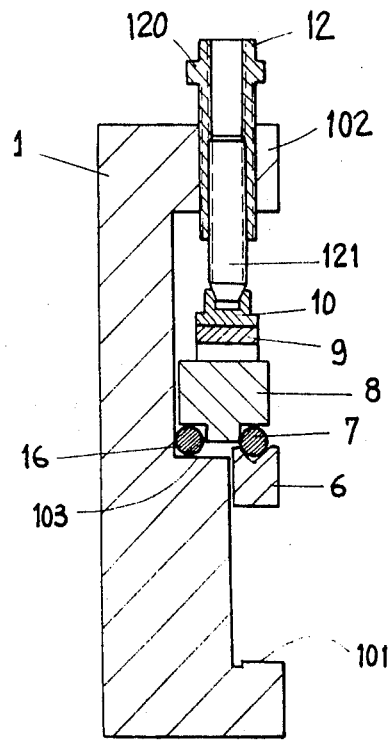

The operation of the differential screws will now be described making reference to FIGS. 4 and 5; the screwed rod 121 reacts against the screw 120 with a force F and bears upon the part 10 with a force $F'=-F$.

Let $f$ be the elementary reaction force exerted by screw 121 on the thread 120 at a point D. The elementary reaction force normal to the screw is given by $\sqrt{2f/3}$. Accordingly, the friction couple opposing the sliding action between the thread of screw 121 and the thread of screw 120, is given by:

$$C_1 = \int_0^l \frac{2kfr}{\sqrt{3}} = \frac{2kFr}{\sqrt{3}}$$

where $l$ is the engaged length of thread between screw 121 and thread 120, $k$ the coefficient of frictions and $r$ the means radius of the thread of screw 121.

Similarly, let $f'$ be the elementary force exerted at a point E, on the mean circumference of the truncate cone of apex angle $\theta$ which terminates the screw 121, by said screw 121 on the part 10. The friction couple exerted by screw 121 on the part 10, is given by:

$$C_2 = \int_0^{2\pi} \frac{f'}{\cos \theta} kr' = \frac{F'}{\cos \theta} kr'$$

where $r'$ is the means radius of the truncate cone terminating the screw 121. Assuming that $r'$ is for all practical purposes equal to $r$, the screw 121 will lock in relation to the part 10 as soon as $F$ is generated, and therefore an automatic transfer to differential operation will take place if: $C_2 > C_1$, and thus if $\theta > 30°$.

An apex angle of 60° for the truncate cone terminating the screw 121 has been chosen in this case.

Of course, the embodiment described is in no way limitative of the scope of the invention and the clamping device in accordance with the invention may be employed for purpose other than that considered here.

What I claim is:
1. A high-precision clamping device comprising:
   a C-shaped stirrup having jaws, a first beam parallel to said jaws; clamping screws for exerting clamping forces on said first beam; inverted-U profiled led bending members interposed between said screws and said first beam; said first beam having two edges parallel to said jaws and being mounted for pivoting about one of said edges and a second beam associated with said first beam for transmitting the force exerted thereon, and mounted for pivoting with respect to said first beam about the other edge.

2. A clamping device as claimed in claim 1, wherein said first beam has two shoulders on its face opposite to that on which said members act, and wherein two circular section bars are located in said shoulders, said stirrup having a shoulder on which rests one of said bars, and said other beam having a recess in which said second bar rests.

3. A clamping device as claimed in claim 2, wherein said second bar is a hollow bar.

4. A clamping device as claimed in claim 2, wherein said second bar is a solid bar and carries a helical groove.

5. A clamping device as claimed in claim 2, wherein said stirrup carries recesses at its edges perpendicular to said jaws.

6. A clamping device as claimed in claim 1, wherein each of said clamping screws comprises a hollow screw screwed into one of said jaws, a threaded rod screwed inside said hollow screw and a part for transmitting the clamping force from said rod to one of said members, along the symmetry plane thereof, said rod having a truncated cone end engaging into a corresponding hollow in said part and said cone having an apex angle for automatic differential screwing.